United States Patent
Sun et al.

(10) Patent No.: US 10,990,989 B2
(45) Date of Patent: Apr. 27, 2021

(54) INCREASING THE LIKELIHOOD OF RECEIVING FEEDBACK FOR CONTENT ITEMS

(71) Applicant: Pandora Media, LLC, Oakland, CA (US)

(72) Inventors: Mingxuan Sun, Baton Rouge, LA (US); Gordon Parker Rios, San Francisco, CA (US)

(73) Assignee: Pandora Media, LLC, Oakland, CA (US)

( * ) Notice: Subject to any disclaimer, the term of this patent is extended or adjusted under 35 U.S.C. 154(b) by 1009 days.

(21) Appl. No.: 14/831,076

(22) Filed: Aug. 20, 2015

(65) Prior Publication Data
US 2017/0053298 A1    Feb. 23, 2017

(51) Int. Cl.
*G06Q 30/02* (2012.01)
(52) U.S. Cl.
CPC ................. *G06Q 30/0203* (2013.01)
(58) Field of Classification Search
CPC .................................. G06Q 30/0203
See application file for complete search history.

(56) References Cited

U.S. PATENT DOCUMENTS

| | | | | |
|---|---|---|---|---|
| 6,314,420 B1* | 11/2001 | Lang | ............. | G06F 16/30 |
| 8,108,406 B2* | 1/2012 | Kenedy | ............. | G06F 16/285 |
| | | | | 707/749 |
| 9,336,268 B1* | 5/2016 | Moudy | ............. | G06F 17/30412 |
| 9,451,306 B2* | 9/2016 | Sarukkai | ............. | H04N 21/23439 |
| 2005/0021470 A1* | 1/2005 | Martin | ............. | G11B 19/025 |
| | | | | 705/51 |
| 2011/0106630 A1* | 5/2011 | Hegeman | ............. | G06Q 30/02 |
| | | | | 705/14.71 |
| 2012/0259919 A1* | 10/2012 | Yan | ............. | G06Q 30/02 |
| | | | | 709/204 |
| 2012/0317123 A1* | 12/2012 | Green | ............. | G06F 16/9535 |
| | | | | 707/748 |
| 2012/0330881 A1* | 12/2012 | Jamal | ............. | G06Q 10/10 |
| | | | | 706/52 |
| 2013/0124258 A1 | 5/2013 | Jamal et al. | | |

(Continued)

OTHER PUBLICATIONS

Wikipedia. "Proportional hazards model," Last Modified Feb. 4, 2016, 7 Pages [online] [Retrieved on Feb. 15, 2016] Retrieved from the internet <URL:https://en.wikipedia.org/wiki/Proportional_hazards_model>.

(Continued)

*Primary Examiner* — Charles Guiliano
*Assistant Examiner* — Po Han Lee
(74) *Attorney, Agent, or Firm* — Fenwick & West LLP

(57) ABSTRACT

A content server system provides content items to a plurality of users in a content stream. The content server system provides an interface to collect feedback from the plurality of users on the content items in the content stream. Based on the collected feedback the content server system generates a feedback model that predicts the likelihood of receiving feedback on a content item at any given time in a streaming session. The content server system then selects a content item in need of feedback and, using the model, determines a time at which the content item is more likely to receive feedback. The content server system then provides the content item to the user at the determined time.

20 Claims, 6 Drawing Sheets

(56) References Cited

U.S. PATENT DOCUMENTS

| | | | |
|---|---|---|---|
| 2013/0174045 A1* | 7/2013 | Sarukkai | H04N 21/23439 715/744 |
| 2013/0232516 A1 | 9/2013 | Paull | |
| 2013/0290110 A1* | 10/2013 | LuVogt | G06F 16/9535 705/14.66 |
| 2014/0101064 A1 | 4/2014 | Bedard | |
| 2014/0195025 A1* | 7/2014 | Wieder | G06F 21/10 700/94 |
| 2014/0304726 A1* | 10/2014 | Hansen | H04N 21/251 725/14 |
| 2014/0316906 A1* | 10/2014 | Cioffi | G06Q 30/0205 705/14.73 |
| 2014/0337097 A1 | 11/2014 | Farlie | |
| 2015/0052554 A1* | 2/2015 | Iyengar | G06Q 30/0205 725/35 |
| 2015/0161686 A1* | 6/2015 | Williams | G06Q 30/0282 705/347 |
| 2015/0178811 A1* | 6/2015 | Chen | G06Q 30/0631 705/26.7 |
| 2015/0289023 A1* | 10/2015 | Richman | H04N 21/2393 725/32 |
| 2015/0379411 A1* | 12/2015 | Kapoor | G06N 7/005 706/14 |
| 2016/0026341 A1* | 1/2016 | Kraev | G06F 3/04817 715/835 |
| 2016/0026930 A1* | 1/2016 | Cheng | G06N 20/00 706/11 |
| 2016/0066018 A1* | 3/2016 | Chesluk | H04N 21/6587 725/25 |
| 2016/0066035 A1* | 3/2016 | Chesluk | H04N 21/4532 725/109 |
| 2016/0066064 A1* | 3/2016 | Chesluk | H04N 21/233 725/93 |
| 2016/0189173 A1* | 6/2016 | King | G06Q 30/0201 705/7.29 |
| 2016/0203190 A1* | 7/2016 | Zinger | G06F 17/30 707/749 |
| 2016/0294909 A1* | 10/2016 | Killick | H04W 4/21 |
| 2016/0315983 A1* | 10/2016 | Lewis | G11B 27/02 |
| 2017/0111501 A1* | 4/2017 | Barbulescu | G06Q 30/0257 |
| 2017/0238039 A1* | 8/2017 | Sabattini | G06F 16/4387 705/14.73 |

OTHER PUBLICATIONS

PCT International Search Report and Written Opinion for PCT/US2016/047652, dated Nov. 16, 2016,.

\* cited by examiner

INCREASING THE LIKELIHOOD OF RECEIVING FEEDBACK FOR CONTENT ITEMS

BACKGROUND

1. Field of Art

The present invention generally relates to determining when to insert digital content into a stream to generate feedback about the content.

2. Background of the Invention

Providers of digital content streams may continuously provide content to a user that satisfies the user's preferences. For example, a provider of a music stream provides songs to a user that satisfies the user's musical preferences. The provider may rely on feedback from the user to determine the user's preferences. In addition, the provider may rely on feedback from other users to determine whether a given user is likely to enjoy a particular content item.

New content items, such as new songs, are continuously introduced to the providers and users. However, these content items lack feedback, or have only a small amount of associated feedback, by virtue of being new. It is therefore difficult for a content provider to predetermine whether a given user will likely enjoy a new content item. Accordingly, the quality of a user's content stream might suffer if the provider introduces a new content item into the stream that does not satisfy the user's preferences.

SUMMARY

In one embodiment, a computer implemented method provides a plurality of content items to a plurality of client devices and collects feedback from the users of the client devices. The collected feedback has associated time data indicating when the feedback was provide by the user. The computer implemented method then generates a feedback model based on the collected feedback data. The feedback model predicts the likelihood of receiving feedback from users at given times while the content items are being provided. Once the model is generated, the computer implemented method selects a content item that requires additional feedback. Using the feedback model, the computer implemented method determines a time when a user is likely to provide feedback. The computer implemented method then provides the content item to the user at the determined time.

In one embodiment, a computer system provides a plurality of content items to a plurality of client devices and collects feedback from the users of the client devices. The collected feedback has associated time data indicating when the feedback was provide by the user. The computer system then generates a feedback model based on the collected feedback data. The feedback model predicts the likelihood of receiving feedback from users at given times while the content items are being provided. Once the model is generated, the computer system selects a content item that requires additional feedback. Using the feedback model, the computer system determines a time when a user is likely to provide feedback. The computer system then provides the content item to the user at the determined time.

In one embodiment, a non-transitory computer readable storage medium stores instructions that are executed by a process to provide a plurality of content items to a plurality of client devices and collects feedback from the users of the client devices. The collected feedback has associated time data indicating when the feedback was provide by the user. The instructions cause a processor to generate a feedback model based on the collected feedback data. The feedback model predicts the likelihood of receiving feedback from users at given times while the content items are being provided. Once the model is generated, the instructions cause a processor to select a content item that requires additional feedback. Using the feedback model, the instructions cause a processor to determine a time when a user is likely to provide feedback. The content item is then provided to the user at the determined time.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
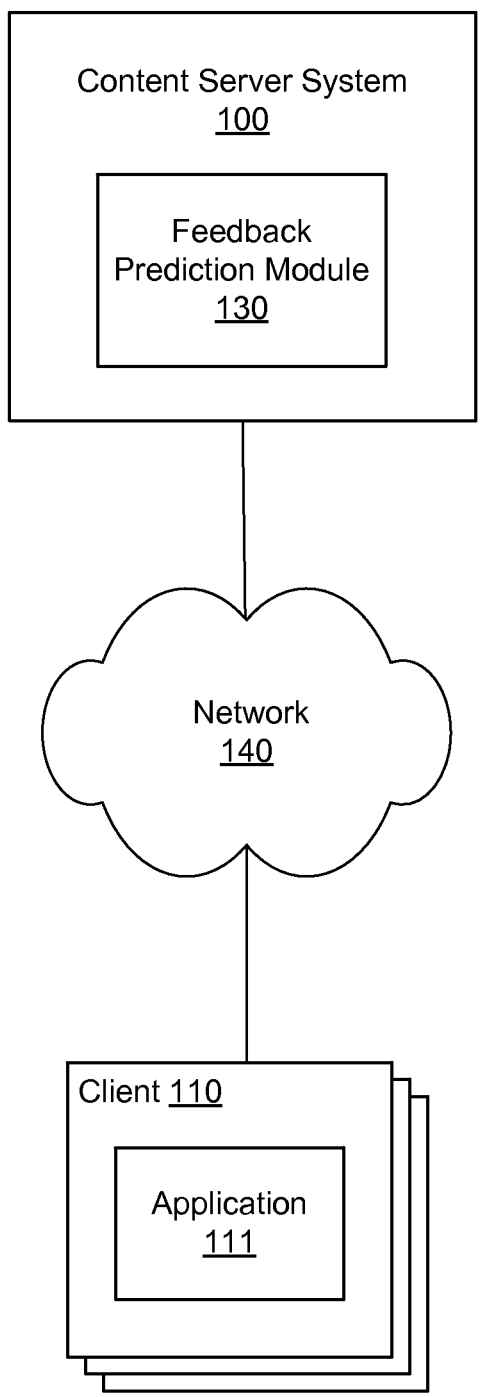
FIG. 1 illustrates a computing environment in which content streaming and feedback collection occur, according to one embodiment.

FIG. 1 illustrates a computing environment in which content streaming and feedback collection occur, according to one embodiment. A content server system 100 provides digital content to client devices 110 in the form of content streams. The feedback prediction module 130 determines when to insert content into a stream in order to increase the likelihood of receiving feedback about that content In one particular embodiment, referred to throughout the remainder of the specification, the content server system 100 provides streamed audio content, such as songs, pieces of music, or audio recordings. It is appreciated, however, that in other embodiments the content server system 100 could alternatively and/or additionally provide other forms of digital content, such as videos, movies, slideshows, images, or non-streamed audio. Thus, subsequent references to "listening" or other audio-related terminology could equally apply to (for example) viewing videos or otherwise experiencing media provided by the content server system 100 in other embodiments.

As described in the remainder of the specification, the content server system 100 uses a feedback prediction module 130 to predict when to insert a subject content item, for which feedback is desired, into a content stream. Feedback data generated by users providing feedback on other content items on other content streams are collected for use by the feedback prediction module 130. The feedback data informs a model generated by the content server system that predicts the likelihood of a user providing feedback at any given time. The feedback prediction module 130 uses the model to determine when to insert the subject content item into the content stream, to increase the likelihood of receiving feedback for the content item.

The client devices 110 are computing devices such as smartphones with an operating system such as ANDROID or APPLE IOS, tablet computers, laptop computers, desktop computers, electronic stereos in automobiles or other vehicles, or any other type of network-enabled device on which digital content may be listened to or otherwise experienced. Typical client devices 110 include the hardware and software needed to input and output sound and images (e.g., speakers and microphone), connect to an electronic network (e.g., via Wifi and/or 4G or other wireless telecommunication standards), determine the current geographic location of the client devices (e.g., a Global Positioning System (GPS) unit), and/or detect motion of the client devices (e.g., via motion sensors such as accelerometers and gyroscopes).

The client devices 110 may have an application 111 that allows interaction with the content server system 100 to provide feedback about content items in a content stream and for controlling the stream. For example, the application 111 could be a browser that allows a user of the client device 110 to obtain content by browsing a web site of the content server system 100. As another example, the application 111 could be a dedicated application specifically designed (e.g., by the organization responsible for the content server system 100) to enable interactions with the content server system 100 and its content. The application 111 on a particular client device 110 may be associated with a user of the client device 110 (e.g., via a one-time registration, or a username and password pair or other credentials). When the application 111 is associated with a user, the application can store or otherwise gain access to the user's past listening history, demographic data about the user (either expressly provided by the user, or inferred based on factors such as listening history, geographic location, name, and the like) and use this information to provide content and advertisements that are most likely to be appreciated by that particular user. In addition to allowing a user to explicitly obtain content from the content server system 100, the application 111 may also implicitly provide the content server system 100 with data about the status and use of the client device 110, such as its network ID, geographic location, physical movement, and/or sound input, although in some embodiments the user of the application may elect to disable this feature.

The content server system 100 and the client devices 110 are connected via a network 140. The network 140 may be any suitable communications network for data transmission. The network 140 uses standard communications technologies and/or protocols and can include the Internet. In another embodiment, the network 140 includes custom and/or dedicated data communications technologies.

Figure 2A:
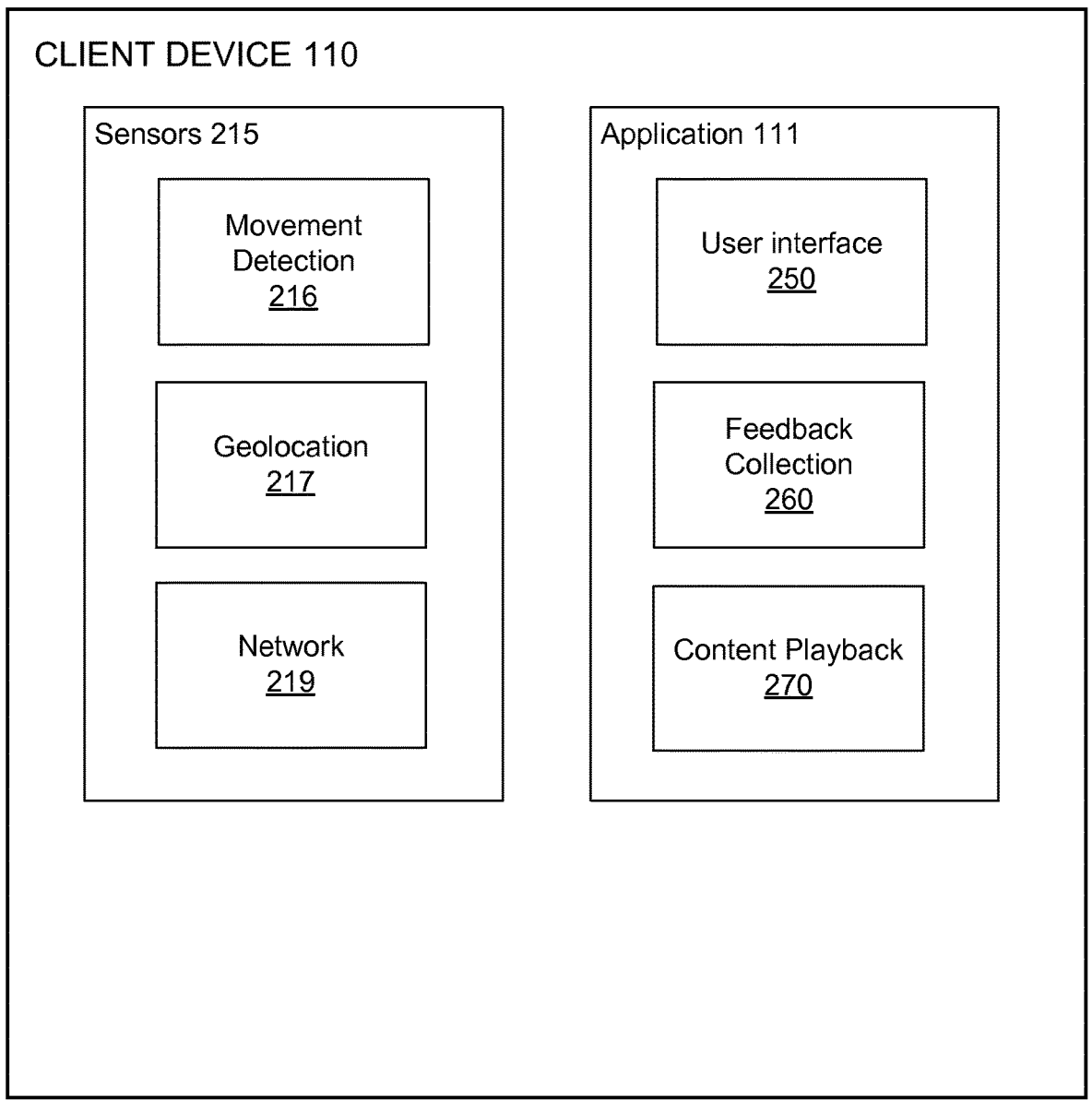
FIG. 2A is a high-level block diagram illustrating a detailed view of a client device of FIG. 1, according to one embodiment.

FIG. 2A is a high-level block diagram illustrating a detailed view of a client device 110 of FIG. 1, according to one embodiment.

A client device has a set of sensors 215 that collect data associated with properties of the client device 110, such as data about the physical environment or state of the client device. Different types or models of client devices may have different sensors. Illustrated in the embodiment of FIG. 2A are a set of sensors 215 particularly appropriate for smartphone client devices, though it is appreciated that other client devices may have different sensors.

The illustrated sensors 215 include a movement detection sensor 216, which detects properties of movement of the client device such as speed, acceleration, or direction. The movement detection sensor 216 may include accelerometers or gyroscopes, for example. Another illustrated sensor is the geolocation sensor 217, which determines a particular geographic location of the client device 110, such as coordinates provided by Global Positioning System (GPS) or other geographic location systems. Another illustrated sensor is a network sensor 219, which identifies a network(s) that the client device 110 is currently using for communication, such as a Wifi network, a 4G network or another telecommunication network.

Figure 2B:
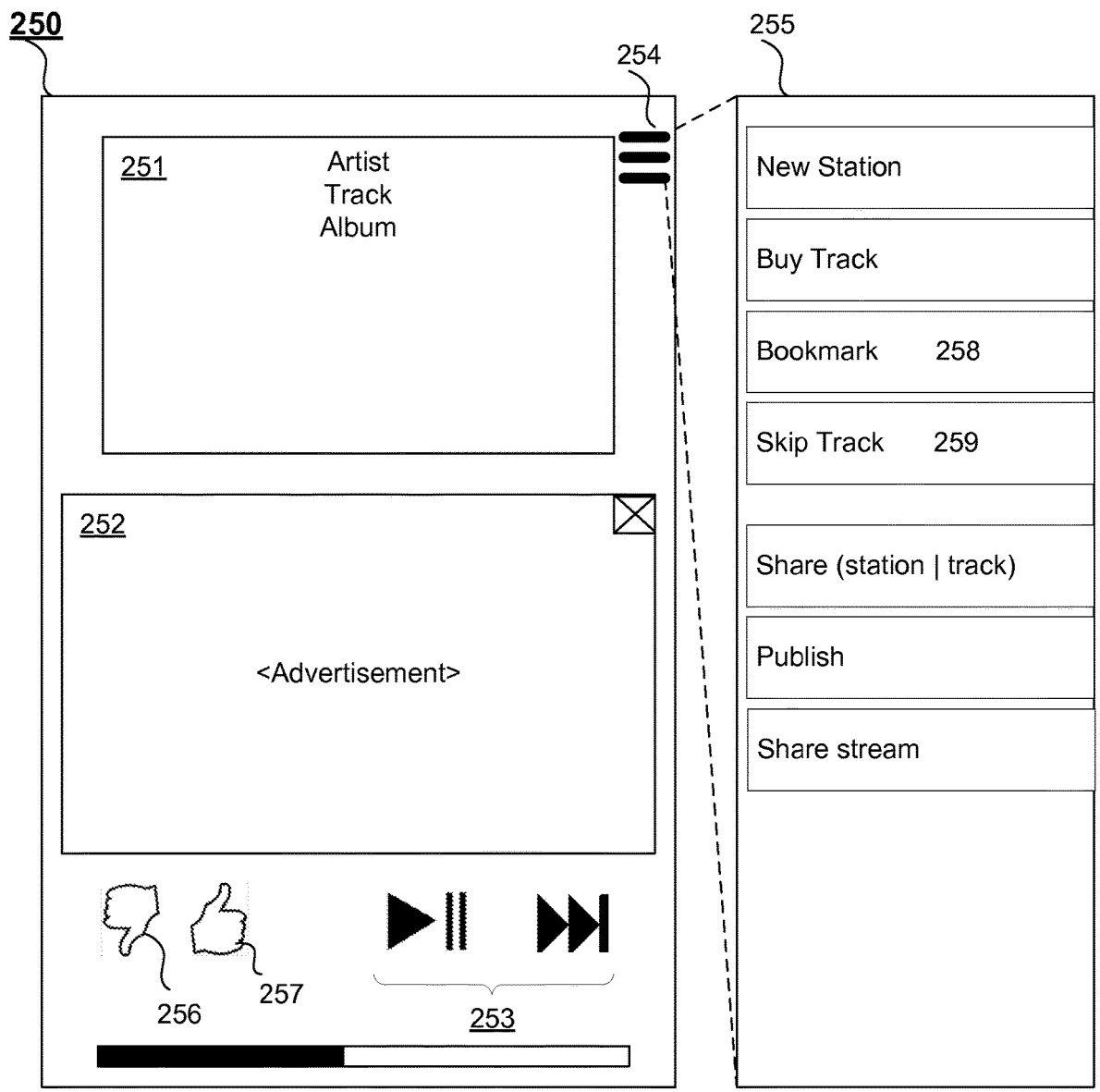
FIG. 2B is an example user interface provided by the application of FIGS. 1 and 2A, according to one embodiment.

The client device 110 may also include an application 111 specifically designed to operate with the content server system 100. For example, in one embodiment the application includes a user interface 250 for interacting with an audio stream, as illustrated in FIG. 2B. The example user interface 250 includes a description area 251 providing information on a currently-playing song or content item, an optional image advertisement 252, controls 253 to pause/play or skip the current streaming content. The example user interface 250 also includes a set of options 255 (shown in response to selection of popup control 254) that include an option to request an audio stream that includes songs (tracks) associated with a particular artist, genre, or the like, and an option to share a stream with other nearby users of the content server system 100 so that the other users can also (for example) react to the currently-playing song, such as registering appreciation for, or dislike of, the song, sharing the song, bookmarking the song, or the like. In addition to controls 253 for controlling the stream the user may also provide direct negative feedback regarding the song or other content item currently playing on the stream by selecting the negative feedback icon 256. Alternatively, the user may provide direct positive feedback by selecting the positive feedback icon 257. The user may also provide indirect feedback by taking other actions on the stream that may be indicative of the user's sentiment towards the song or content item currently streaming but are not explicit indications of user sentiment. Some of these actions include but are not limited to bookmarking a content item for later reference by selecting the bookmark option 258 and skipping the current song or content item by selecting the skip track option 259 or using the skip song button in the controls 253. In some embodiments, the act of leaving the stream altogether provides an instance of additional indirect feedback.

Returning again to FIG. 2A, in some embodiments the application 111 includes a feedback collection module 260. The feedback collection module 260 monitors feedback provided via the user interface 250 and, upon detecting feedback, associates feedback context data and other metadata with the instance of feedback. For example, the feedback module 260 detects a user's selection of the positive feedback icon 257 and so assigns a positive feedback metadata label to the instance of feedback. Upon receiving user feedback, the feedback collection module 260 sends the feedback data to the content server system 100 including a time stamp indicating the time at which the feedback was received.

The feedback collection module 260 collects feedback data regarding the instance of feedback including but not limited to the time of the feedback and the type of feedback (e.g positive or negative feedback). The content server system 100 uses the initial feedback data and generates extended features for storage in association with the feedback data including but not limited to time related feedback data, features of the content item, features of the content stream, or features of the user providing the feedback. For example, features of the user, content stream, or the content itself may be stored in the content server system 100 and may be reported to the feedback prediction module 130. In some embodiments, the content server system 100 generates additional data that incorporate multiple instances of feedback such as measures of feedback frequency in relation to a streaming session or a particular period of time, for example, instances of feedback per streaming session, or instances of feedback per month of the user providing the feedback. For these types of data, there may be a threshold number of instances of feedback to be exceeded before the data are generated. Thus an instance of feedback may include time related feedback data, stream features, content features, and user features along with metadata describing the feedback received by the feedback collection module 260.

Time related feedback data are the times at which feedback was provided by the user in relation to calendar events or session events. For example, time related feedback data may include the time of day that the feedback was received, the day of the week that the feedback was received, or the time from the beginning of the streaming session to the time at which the feedback was received.

Stream features are feedback data indicating the attributes of the stream. In a music stream, the stream features may include a genre of the playlist in the stream, an artist associated with the stream, and the like. In some embodiments, stream features may also include statistics relating to the usage of the stream by a user, for example, the popularity of the stream with a particular user over other streams or the total time a user has spent listening to the stream.

Content features are feedback data indicating the attributes of the content for which the feedback is provided. In a music streaming system, content features may be any attribute of a song including any of the song's musical qualities, the song's length, the similarity value of the song when compared to the stream as whole, etc.

User features are demographic data of a user including a user's age, gender, listening history, and location. In some embodiments, user features include location data from the geolocation sensor 217, the current level or type of movement experienced by the client device 110 of the user from the movement detection sensor 216, or the wifi network being used by the user according to the network sensor 219. Additionally, the feedback frequency data relative to specific time periods may be saved in association with a user and so are included in the user features. Additionally user features may include the frequency with the user provides feedback on a per session, per day, per week, or other basis.

The content playback module 270 functions to control the streaming of content to the client device 110. Based on a user's interactions with the user interface 250, the content playback module 270 makes stream requests to the content server system 100. For example, if the user selects a play button included in the controls 253 of the user interface the content playback module 270 will request a stream from the content server system 100. If the user selects to skip to the next song or content item, the content playback module 270 will request to stream a new song or content item from the content server system 100. The content playback module 270 receives streaming data from the content server system 100 and prepares the content for presentation to the user via the user interface 250.

Figure 3:
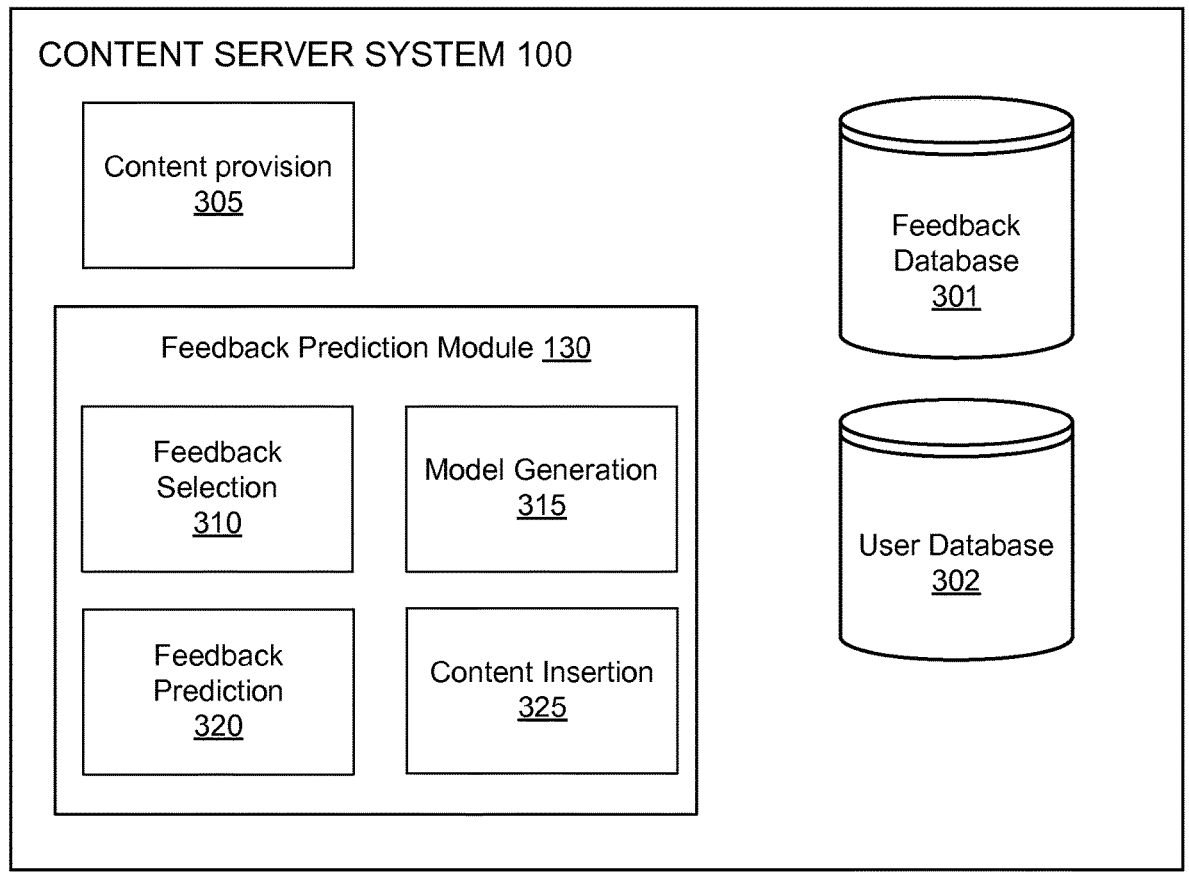
FIG. 3 is a high-level block diagram illustrating a detailed view of the content server system of FIG. 1, according to one embodiment.

FIG. 3 is a high-level block diagram illustrating a detailed view of the content server system 100 of FIG. 1, according to one embodiment.

The content server system 100 includes a feedback database 301. The feedback database 301 stores feedback data received from the clients 110 and/or and any extended feedback features provided by the content server system. Feedback data stored in the feedback database 301 are associated with the user that provided the feedback, the stream on which the feedback was provided, and the particular content item for which the user provided feedback.

The content server system 100 also includes a user database 302, which stores demographic data and listening histories of the users. For example, user features may be stored in the user database 302.

The content server system 100 includes a content provision module 305 that provides requested content to the application 111 of the requesting client device 110 in a streaming session. A streaming session begins upon a request by the user to begin a stream. The stream has a set of attributes relating to the type of content that may be provided to the stream. The streaming session begins upon the request of a user and ends when the user leaves the stream in the application 111. A streaming session may be paused and may continue after a pause while remaining in the same session. For embodiments in which the stream is an audio stream, for example, the content provision module 305 initiates a stream of the requested audio, streaming the audio to the client device 110 over time. The content provision module 305 determines content to provide to the application 111 via the network 140 based on stream attributes compared to attributes of available content in addition to user feedback and demographic information from the feedback database 301 and the user database 302. Additionally the content provision module 305 may provide content based on when the user is predicted to provide feedback such that the provided content is more likely to receive feedback from the user experiencing the stream.

The content server system 100 contains the feedback prediction module 130, which generates a predictive feedback model and uses that model to determine when to insert a content item into a stream in order to increase the likelihood of receiving feedback about the content item. The feedback prediction module 130 contains a number of sub-modules including a feedback selection sub-module 310, a model generation sub-module 315, a feedback prediction sub-module 320, and a song insertion sub-module 325.

The feedback selection module 310 selects feedback stored in the feedback database 301. In some embodiments, the feedback selection module 310 identifies a particular set of users from which to select feedback data based on a random sample of the users present in the user database 302. The feedback selection module 310 may communicate the identified set of users to the feedback collection modules 260 of applications 111 associated with the identified users such that the appropriate data is collected from those users. The feedback selection module 310 references the feedback database 301 to retrieve the stored feedback data. In some embodiments, the feedback selection module accesses the feedback database 301 only periodically. Additionally, the feedback selection module 310 may only access a subset of the feedback data. Upon selecting the feedback data from the feedback database 301, the feedback selection module 310 provides the selected feedback data to the model generation module 315.

The model generation module 315 uses the selected feedback data to generate one or more models predicting the likelihood of receiving feedback on a content item in a given streaming session at a given time. The one or more predictive models may be generated using any suitable machine learning or statistical technique. In some embodiments, the model uses a random sample of streams in the content server system as a training set for the model. In other embodiments, a random sample of users is used instead thus removing any bias created by high frequency users.

In some embodiments, a separate model may be generated for each type of feedback. For example, a model may be generated to predict the likelihood of receiving direct feedback and an additional model may be generated to predict the likelihood or receiving indirect feedback.

The model generation module 315 is configured by the content stream provider to use particular feedback data for covariates in the model. Covariates are features in the feedback data that affect the likelihood of receiving feedback in a streaming session. In one embodiment, all features in the feedback data are treated as covariates. Other embodiments may use a subset of the features as covariates in the model. The stream provider (e.g. a system administrator or model designer) may determine that some features are not included as covariates in the model by performing individual statistical tests on each of the features to determine if there is any correlation between the likelihood of receiving feedback and each feature question.

In some embodiments, the predictive model is a survival analysis model or, more specifically, a Cox Proportional Hazards model (CPH model). The CPH model, as well as other survival analysis models are created using data where each entry has an indication of an event or a lack of an event (censoring event), a time elapsed value from time zero (defined as the beginning of observation), and a value for each of the covariates that might have an effect on the occurrence of the event. As used in the model generation module, the event of interest is the receipt of feedback by the feedback collection module 260 of an application 111 on a client device 110. Time zero is defined as the beginning of a streaming session, the beginning of a day, the beginning of a week, or the beginning of any time period depending on the embodiment. The covariates for the feedback data are described in relation to the feedback collection module 260. The table below shows an example data set of feedback events for a CPH model. For the purpose of conserving space, the number of covariates and the number of feedback events are reduced.

| Stream Number | Feedback Received | Feedback Time Since Session Start (min) | Covariate 1 (C1) | C2 | C3 | C4 | C5 | C6 |
|---|---|---|---|---|---|---|---|---|
| 1 | 1 | 2 | 1 | 1 | 1 | 1 | 1 | 15 |
| 2 | 1 | 5 | 1 | 1 | 1 | 1 | 1 | 4 |
| 3 | 1 | 4 | 0 | 1 | 1 | 1 | 0 | 12 |
| 4 | 0 | 45 | 1 | 0 | 1 | 1 | 1 | 34 |
| 5 | 1 | 23 | 1 | 1 | 0 | 1 | 0 | 18 |

The above table is organized by streaming session but could easily be modified to represent data by user. The first column from the left identifies the streaming session for which the feedback data was received. The second column is a binary value indicating whether feedback was received during the feedback session indicated in the first column. The third column indicates the time at which the feedback was received. If no feedback was received during the streaming session, the third column indicates the length of the streaming session.

The columns to the right of the feedback time column indicate the values of each covariate determined by the model generation module 315. Depending on the embodiment, covariates may be binary or quantitative variables. Categorical variables may be treated as multiple binary variables, for example the day of the week may be represented as seven binary variables for each day of the week. In this case, if the instance of feedback occurred on a Wednesday the binary value for Wednesday would be 1 while the binary value for every other day of the week would be zero. In the embodiment exemplified by the table above C1, C2, C3, C4, and C5 are binary variables, and C6 is quantitative. The binary covariates may represent any feedback data that is binary in nature such as whether the feedback was direct or indirect, whether the feedback was provided in relation to a content item of a particular genre, etc. The quantitative covariates, represent any feedback data that is quantitative in nature, such as the feedback frequency of a user on a per session basis, the similarity of the content item for which feedback was provided when compared to the stream, etc.

The output of a CPH model is a hazard function $\lambda_1(t)$, which describes the likelihood at a time t that an event will occur given a set of set of covariates $\{c_1, c_2, \ldots, c_n\}$. In the case of the content server system 100, the hazard function indicates the likelihood of receiving a feedback event at a given time into a streaming session. A baseline hazard function $\lambda_0(t)$ is used to determine a hazard function $\lambda_1(t)$. In some embodiments, the model generation module 315 determines the baseline hazard function from feedback data. In other embodiments, other common baseline hazard functions are used. Each covariate is assumed to have a proportional effect on the hazard function and has a corresponding coefficient $\beta$ indicating the proportionality of a unit increase in the value of the corresponding covariate. Thus, a CPH model can be represented by the following equation:

$$\lambda_1(t) = \lambda_0(t) e^{\beta_1 c_1 + \beta_2 c_2 + \beta_3 c_3 + \ldots + \beta_n c_n}$$

Using a data set like the data displayed in the table above, the model generation module 315 uses the maximum likelihood method to computationally determine the value for all coefficients $\beta$, thereby training the feedback prediction model. The model generation module 315 may perform this model training step periodically or continuously to update the feedback prediction model based on newly received feedback data.

Once the model is generated, the feedback prediction module 320 applies the predictive feedback model to a target streaming session for the content item selected for insertion to predict an insertion time that increases the likelihood of receiving feedback. The process of predicting an insertion time may be initiated when the streaming session begins or at any point during the streaming session depending on the embodiment. The feedback prediction module 320 determines values for the covariates of the predictive feedback model corresponding to the target stream and the selected content. The feedback prediction module 320 determines covariates that are associated with users by accessing features associated with the selected content, the target stream, and the user experiencing the target stream. With the coefficient values, the feedback prediction module 320 calculates a value of the function $\lambda_1(t)$ corresponding to the target stream. The function predicts the likelihoods that the user will provide feedback about a streaming content item at discrete times t elapsed since initiation of the streaming session.

Based on the resulting function, the content insertion module 325 calculates a time to insert a selected content item into the target stream that increases the likelihood of receiving feedback about the content item. In some embodiments, the content insertion module 325 selects a time corresponding to the maximum of the hazard function. The maximum may also be a local maximum, in which case the maximum of the hazard function is calculated only within a predetermined amount of time from the beginning of the streaming session. In other embodiments, the content insertion module 325 selects a time corresponding to the earliest time at which the hazard function is above a likelihood threshold. The likelihood threshold may be predetermined in the content server system 100 or it may be relative to the function.

Once the feedback prediction module 320 determines when the user is likely to provide feedback, the content insertion module 325 inserts the selected content item into the content stream at the determined time. This is accomplished by inserting the selected content item into the queue of content items generated by the content provision module 305. In some embodiments, the queue may be reordered so the selected content item may be inserted closer to the time when the user is predicted to be likely to provide feedback. Alternatively, the content insertion model may insert the content item before the calculated insertion time such that the content item will be presented to the user when the calculated insertion time occurs.

The feedback prediction and content insertion processes may be completed on many active streams in parallel. In some embodiments, the model corresponding to a particular stream may be calculated in advance of the user beginning the streaming session such that an insertion time has already been determined.

Figure 4:
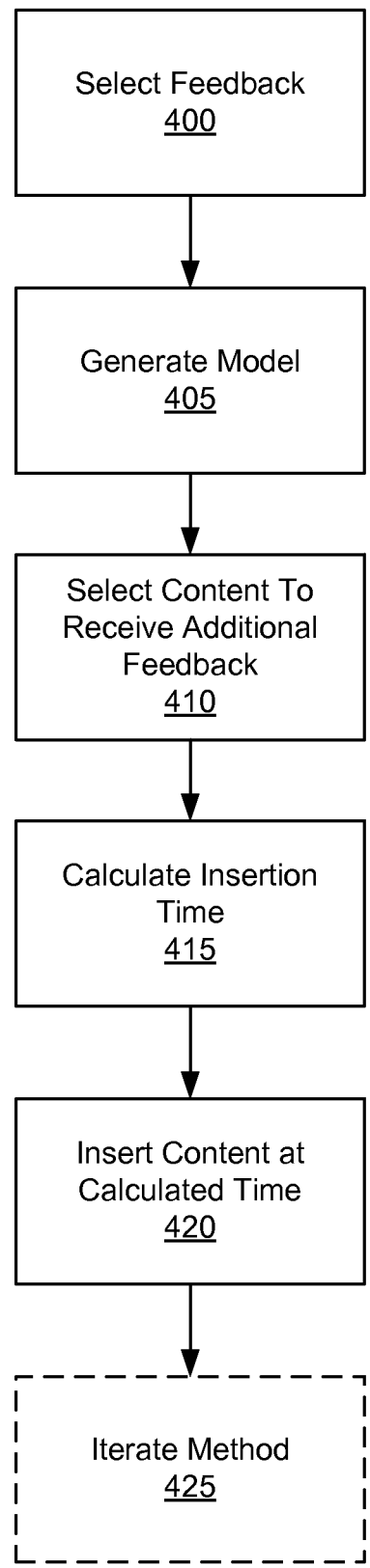
FIG. 4 is a flow diagram illustrating the method of determining an insertion time that increases the likelihood of receiving feedback for a content item, according to one embodiment.

FIG. 4 is a flow diagram illustrating the method of determining an insertion time that increases the likelihood of receiving feedback for a content item, according to one embodiment. In one embodiment, the steps of FIG. 4 are performed by the feedback prediction module 130. In other embodiments, some or all of the steps may be performed by different entities. In addition, some embodiments may include different or additional steps, and perform the steps in different orders.

The feedback selection module 310 selects 400 feedback data from the feedback database 301 collected by the feedback collection module 260 and/or provided by the content server system 100. Upon selecting 400 the feedback data, the model generation module 315 generates 405 a predictive feedback model relating the likelihood of receiving an instance of feedback based on a time from the beginning of a streaming session (or another time depending on the embodiment) and the covariates determined by the model generation module 315.

The feedback prediction module 130 selects 410 a subject content item for which feedback is desired from the content server system 100. The subject content may be selected based on the amount of feedback currently stored in relation to the content. For example, subject content for which less than a threshold amount of feedback has been collected might be selected. Likewise, the subject content may be selected based on the time at which the content item was received by the content server system 100. For example, content received by the content server system within a threshold of time (e.g., within the last day or week) may be selected. The subject content may also be selected based on other considerations, such as whether other content from the same source (e.g., artist) is held by the content server system 100.

The feedback prediction module 130 calculates 415 an insertion time that increases the likelihood of receiving feedback for the selected subject content item by using the generated model and evaluating it for each potential target content stream. The content insertion module 325 then determines the insertion time using the evaluated model. Once an insertion time has been determined the content insertion module 325 inserts 425 the selected content item into the queue of content items to be provided to the target stream such that the content item will play when the user is predicted to provide feedback. Optionally the feedback prediction module may continually update the predictive feedback model by iterating 425 through the method as additional feedback becomes available.

Figure 5:
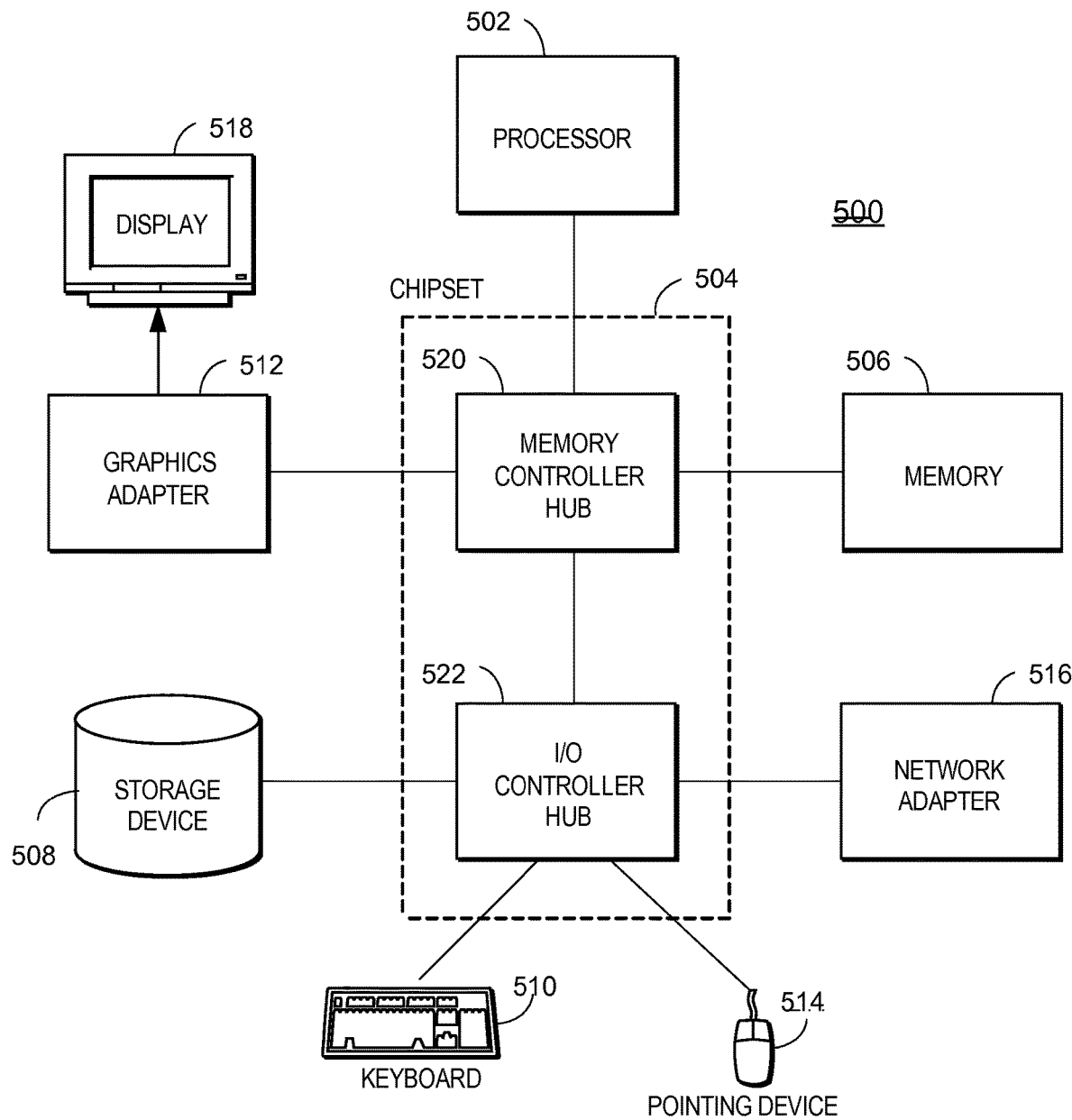
FIG. 5 is a high-level block diagram illustrating physical components of a computer 500 used as part or all of the content server system or client device from FIG. 1, according to one embodiment.

FIG. 5 is a high-level block diagram illustrating physical components of a computer 500 used as part or all of the content server system 100 or client device 110 from FIG. 1, according to one embodiment. Illustrated is at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518; similarly, a computer 500 acting as a smartphone may lack a keyboard 510 or external pointing device 514, for example. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of collecting feedback for a content item, comprising:
    collecting instances of feedback provided via a user interface of a content streaming application from each of a plurality of client devices, each instance of collected feedback received during playback of a content item of a plurality of content items provided to a respective one of the plurality of client devices used by a respective one of a plurality of users through the content streaming application, and each instance of the collected feedback including associated time data indicating when the instance of feedback was provided by the respective user;
    generating a feedback model based on the collected instances of feedback, the feedback model predicting likelihoods of receiving feedback from users of the plurality of users at given times;
    receiving a request, by a first user, to initiate a streaming session at a client device, the streaming session comprising streaming content items of a streaming playlist to the first user, the content items selected from the plurality of content items based on one or more attributes associated with input specified by the first user, the request initiated by a user selection of a selectable option corresponding to beginning the streaming session;
    responsive to receiving the request, selecting, for inclusion in the streaming playlist of the streaming session, a new content item for which less than a threshold number of instances of feedback has been collected due to the new content item being added to the plurality of content items and newly received by a content server within a threshold amount of time, the new content item selected at least in part on a similarity with at least a portion of the one or more attributes, wherein the content server selects the new content to be provided to the content streaming application for insertion into the streaming playlist;
    determining, using the feedback model, a time when the first user of the plurality of users is likely to provide feedback through the content streaming application during playback of the new content item;
    inserting the new content item into the streaming playlist of the streaming session at a position corresponding to the time when the first user is likely to provide feedback;
    streaming, using the content streaming application during the streaming session, the new content item to the first user for playback at the determined time when the first user is likely to provide feedback based on the position in the streaming playlist, and generating for display a selectable feedback option graphical element using the user interface of the content streaming application during the playback of the new content item;
    detecting, during the streaming session, user interaction with the selectable feedback option graphical element;
    responsive to detecting the user interaction with the selectable feedback option graphical element, collecting, during the streaming session, an additional instance of feedback from the first user about the new content item;
    selecting a subset of the plurality of content items to provide to the plurality of client devices used by the plurality of users, the subset of the plurality of content items selected based on the instances of collected feedback and the additional instance of feedback;
    detecting a selection of a playback control graphical element selectable by a second user of the plurality of users in the user interface of the streaming application installed on the client device used by the second user; and
    responsive to detecting the selection of the playback control graphical element, providing the selected subset of the plurality of content items to the client device used by the second user.

2. The computer implemented method of claim 1, wherein the subset of the plurality of content items is a first subset of the plurality of content items, wherein the streaming session is a first streaming session, and wherein collecting instances of feedback related to content items comprises:
    providing a second subset of the plurality of content items to a client device of a third user during a second streaming session; and
    receiving feedback from the third user during the second streaming session, the feedback indicating a sentiment of the third user toward a content item provided in the second streaming session and having associated time data indicating when the feedback was received from the third user relative to the second streaming session;
    wherein the feedback model is generated based at least in part on the feedback received from the third user.

3. The computer implemented method of claim 1, wherein generating the feedback model comprises:

selecting a subset of the collected instances of feedback;
receiving a selection of covariates based on the instances of feedback, where the covariates are features from the instances of feedback that affect a likelihood of receiving feedback in the streaming session; and
generating a hazard function responsive to the selected covariates.

4. The computer implemented method of claim 3, wherein generating the hazard function comprises:
generating a Cox Proportional Hazards model of the form $$\lambda 1\ t = \lambda 0\ te\beta 1c1+\beta 2c2+\beta 3c3+\ldots +\beta ncn,$$

wherein $\lambda 1t$ is the hazard function and $\lambda 0t$ is a baseline hazard function, $\beta$ are coefficients corresponding to each covariate, and c are the input covariate values corresponding to the streaming session; and
using a maximum likelihood method to determine values for the coefficients $\beta$ based on the subset of the collected instances of feedback.

5. The computer implemented method of claim 1, wherein determining the time when the first user of the plurality of users is likely to provide feedback comprises:
determining covariates associated with the first user and the streaming session; and
applying the determined covariates to the feedback model to predict likelihoods that the first user will provide feedback at discrete elapsed times after initiation of the streaming session.

6. The computer implemented method of claim 1, wherein streaming the new content item to the first user at the determined time when the first user is likely to provide feedback comprises:
inserting the new content item into a content stream being provided to the first user to cause the new content item to be presented to the first user at the determined time.

7. The computer implemented method of claim 1, wherein the feedback model indicates the time when the first user of the plurality of users is likely to provide feedback relative to a start of the streaming session and wherein the determined time is relative to the start of the streaming session.

8. A computer system for collecting feedback for a content item, comprising:
a computer processor for executing computer program instructions; and
a non-transitory computer readable storage medium storing computer program instructions executable to perform steps comprising:
collecting instances of feedback provided via a user interface of a content streaming application from each of a plurality of client devices, each instance of collected feedback received during playback of a content item of a plurality of content items provided to a respective one of the plurality of client devices used by a respective one of a plurality of users through the content streaming application, and each instance of the collected feedback including associated time data indicating when the instance of feedback was provided by the respective user;
generating a feedback model based on the collected instances of feedback, the feedback model predicting likelihoods of receiving feedback from users of the plurality of users at given times;
receiving a request, by a first user, to initiate a streaming session at a client device, the streaming session comprising streaming content items of a streaming playlist to the first user, the content items selected from the plurality of content items based on one or more attributes associated with input specified by the first user, the request initiated by a user selection of a selectable option corresponding to beginning the streaming session;
responsive to receiving the request, selecting, for inclusion in the streaming playlist of the streaming session, a new content item for which less than a threshold number of instances of feedback has been collected due to the new content item being added to the plurality of content items and newly received by a content server within a threshold amount of time, the new content item selected at least in part on a similarity with at least a portion of the one or more attributes, wherein the content server selects the new content to be provided to the content streaming application for insertion into the streaming playlist;
determining, using the feedback model, a time when the first user of the plurality of users is likely to provide feedback through the content streaming application during playback of the new content item;
inserting the new content item into the streaming playlist of the streaming session at a position corresponding to the time when the user is likely to provide feedback;
streaming, using the content streaming application during the streaming session, the new content item to the first user for playback at the determined time when the first user is likely to provide feedback based on the position in the streaming playlist, and generating for display a selectable feedback option graphical element using the user interface of the content streaming application during the playback of the new content item;
detecting, during the streaming session, user interaction with the selectable feedback option graphical element;
responsive to detecting the user interaction with the selectable feedback option graphical element, collecting, during the streaming session, an additional instance of feedback from the first user about the new content item;
selecting a subset of the plurality of content items to provide to the plurality of client devices used by the plurality of users, the subset of the plurality of content items selected based on the instances of collected feedback and the additional instance of feedback;
detecting a selection of a playback control graphical element selectable by a second user of the plurality of users in the user interface of the streaming application installed on the client device used by the second user; and
responsive to detecting the selection of the playback control graphical element, providing the selected subset of the plurality of content items to the client device used by the second user.

9. The computer system of claim 8, wherein the subset of the plurality of content items is a first subset of the plurality of content items, wherein the streaming session is a first streaming session, and wherein collecting instances of feedback related to content items comprises:
providing a second subset of the plurality of content items to a client device of a third user during a second streaming session; and
receiving feedback from the third user during the second streaming session, the feedback indicating a sentiment of the third user toward a content item provided in the second streaming session and having associated time data indicating when the feedback was received from the third user relative to the second streaming session;

wherein the feedback model is generated based at least in part on the feedback received from the third user.

10. The computer system of claim 8, wherein generating the feedback model comprises:
   selecting a subset of the collected instances of feedback;
   receiving a selection of covariates from the instances of feedback for use in the feedback model, where the covariates are features from the instances of feedback that affect a likelihood of receiving feedback in the streaming session; and
   generating a hazard function responsive to the selected covariates.

11. The computer system of claim 10, wherein generating the hazard function comprises:
   generating a Cox Proportional Hazards model of the form $$\lambda 1\ t = \lambda 0\ te\beta 1c1 + \beta 2c2 + \beta 3c3 + \ldots + \beta ncn,$$

wherein $\lambda 1t$ is the hazard function and $\lambda 0t$ is a baseline hazard function, $\beta$ are coefficients corresponding to each covariate, and c are the input covariate values corresponding to the streaming session; and
   using a maximum likelihood method to determine values for the coefficients $\beta$ based on the subset of the collected instances of feedback.

12. The computer system of claim 8, wherein determining a time when the first user of the plurality of users is likely to provide feedback comprises:
   determining covariates associated with the first user and the streaming session providing a stream of content items to the first user; and
   applying the determined covariates to the feedback model to predict likelihoods that the first user will provide feedback at discrete elapsed times after initiation of the streaming session.

13. The computer system of claim 8, wherein streaming the new content item to the first user at the determined time when the first user is likely to provide feedback comprises:
   inserting the new content item into a content stream being provided to the first user to cause the new content item to be presented to the first user at the determined time.

14. The computer system of claim 8, wherein the feedback model indicates the time when the first user of the plurality of users is likely to provide feedback relative to a start of the streaming session and wherein the determined time is relative to the start of the streaming session.

15. A non-transitory computer readable storage medium storing computer program instructions executable to perform steps comprising:
   collecting instances of feedback provided via a user interface of a content streaming application from each of a plurality of client devices, each instance of collected feedback received during playback of a content item of a plurality of content items provided to a respective one of the plurality of client devices used by a respective one of a plurality of users through the content streaming application, and each instance of the collected feedback including associated time data indicating when the instance of feedback was provided by the respective user;
   generating a feedback model based on the collected instances of feedback, the feedback model predicting likelihoods of receiving feedback from users of the plurality of users at given times;
   receiving a request, by a first user, to initiate a streaming session at a client device, the streaming session comprising streaming content items of a streaming playlist to the first user, the content items selected from the plurality of content items based on one or more attributes associated with input specified by the first user, the request initiated by a user selection of a selectable option corresponding to beginning the streaming session;
   responsive to receiving the request, selecting, for inclusion in the streaming playlist of the streaming session, a new content item for which less than a threshold number of instances of feedback has been collected due to the new content item being added to the plurality of content items and newly received by a content server within a threshold amount of time, the new content item selected at least in part on a similarity with at least a portion of the one or more attributes, wherein the content server selects the new content to be provided to the content streaming application for insertion into the streaming playlist;
   determining, using the feedback model, a time when the first user of the plurality of users is likely to provide feedback through the content streaming application during playback of the new content item;
   inserting the new content item into the streaming playlist of the streaming session at a position corresponding to the time when the first user is likely to provide feedback;
   streaming, using the content streaming application during the streaming session, the new content item to the first user for playback at the determined time when the first user is likely to provide feedback based on the position in the streaming playlist, and generating for display a selectable feedback option graphical element using the user interface of the content streaming application during the playback of the new content item;
   detecting, during the streaming session, user interaction with the selectable feedback option graphical element;
   responsive to detecting the user interaction with the selectable feedback option graphical element, collecting, during the streaming session, an additional instance of feedback from the first user about the new content item;
   selecting a subset of the plurality of content items to provide to the plurality of client devices used by the plurality of users, the subset of the plurality of content items selected based on the instances of collected feedback and the additional instance of feedback;
   detecting a selection of a playback control graphical element selectable by a second user of the plurality of users in the user interface of the streaming application installed on the client device used by the second user; and
   responsive to detecting the selection of the playback control graphical element, providing the selected subset of the plurality of content items to the client device used by the second user.

16. The non-transitory computer readable storage medium of claim 15, wherein the subset of the plurality of content items is a first subset of the plurality of content items, wherein the streaming session is a first streaming session, and wherein collecting instances of feedback related to content items comprises:
   providing a second subset of the plurality of content items to a client device of a third user during a second streaming session; and
   receiving feedback from the third user during the second streaming session, the feedback indicating a sentiment of the third user toward a content item provided in the second streaming session and having associated time data indicating when the feedback was received from the third user relative to the second streaming session;

wherein the feedback model is generated based at least in part on the feedback received from the third user.

17. The non-transitory computer readable storage medium of claim 15, wherein generating the feedback model comprises:

selecting a subset of the collected instances of feedback;

receiving a selection of covariates from the instances of feedback for use in the feedback model, where the covariates are features from the instances of feedback that affect a likelihood of receiving feedback in the streaming session; and generating a hazard function responsive to the selected covariates.

18. The non-transitory computer readable storage medium of claim 17, wherein generating the hazard function comprises:

generating a Cox Proportional Hazards model of the form $$\lambda 1\ t = \lambda 0\ te^{\beta 1c1 + \beta 2c2 + \beta 3c3 + \ldots + \beta ncn},$$

wherein $\lambda 1t$ is the hazard function and $\lambda 0t$ is a baseline hazard function, $\beta$ are coefficients corresponding to each covariate, and c are the input covariate values corresponding to the streaming session; and using a maximum likelihood method to determine values for the coefficients $\beta$ based on the subset of the collected instances of feedback.

19. The non-transitory computer readable storage medium of claim 15, wherein determining the time when the first user of the plurality of users is likely to provide feedback comprises:

determining covariates associated with the first user and the streaming session; and applying the determined covariates to the feedback model to predict likelihoods that the first user will provide feedback at discrete elapsed times after initiation of the streaming session.

20. The non-transitory computer readable storage medium of claim 15, wherein the feedback model indicates the time when the first user of the plurality of users is likely to provide feedback relative to a start of the streaming session and wherein the determined time is relative to the start of the streaming session.

* * * * *